United States Patent
Ambati et al.

(10) Patent No.: US 11,611,666 B2
(45) Date of Patent: Mar. 21, 2023

(54) METHOD AND NETWORK NODE FOR IMPLEMENTING USER DEFINED POLICIES BASED ON DEVICE SUBSCRIPTION IDENTIFIERS IN A TELECOMMUNICATION NETWORK

(71) Applicant: Telefonaktiebolaget LM Ericsson (publ), Stockholm (SE)

(72) Inventors: Suresh Babu Ambati, Chennai (IN); Suganya Malar Mani, Chennai (IN); Sujitha Navaneethakrishnan, Chennai (IN); Meenakshi Sundaram Sarveswaran, Erode (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/734,763

(22) PCT Filed: Jun. 8, 2018

(86) PCT No.: PCT/IN2018/050378
§ 371 (c)(1),
(2) Date: Dec. 3, 2020

(87) PCT Pub. No.: WO2019/234758
PCT Pub. Date: Dec. 12, 2019

(65) Prior Publication Data
US 2021/0243308 A1 Aug. 5, 2021

(51) Int. Cl.
*H04M 15/00* (2006.01)

(52) U.S. Cl.
CPC ........... *H04M 15/66* (2013.01); *H04M 15/64* (2013.01); *H04M 2215/7222* (2013.01); *H04M 2215/7245* (2013.01)

(58) Field of Classification Search
CPC ................. H04M 15/66; H04M 15/64; H04M 2215/7222; H04M 2215/7245
See application file for complete search history.

(56) References Cited

U.S. PATENT DOCUMENTS

| | | | |
|---|---|---|---|
| 2012/0084425 A1* | 4/2012 | Riley | H04M 15/765 709/223 |
| 2015/0105045 A1 | 4/2015 | Rolfe et al. | |

(Continued)

FOREIGN PATENT DOCUMENTS

| | | |
|---|---|---|
| CN | 1705270 A | 12/2005 |
| CN | 102377585 A | 3/2012 |

(Continued)

OTHER PUBLICATIONS

EPO Communication and Search Report dated Dec. 8, 2021 for Patent Application No. EP18921378, consisting of 16-pages.

(Continued)

*Primary Examiner* — Pakee Fang
(74) *Attorney, Agent, or Firm* — Christopher & Weisberg, P.A.

(57) ABSTRACT

A method for implementing user defined policies in a communication network. In one aspect, a policy function (e.g., an online charging system (OCS)) receives a policy information request having a subscription identifier, SID, identifying a subscription where a set of two or more policies are linked to the SID, and one of the policies included in the set of policies is set as an active policy for the subscription, and where each policy is associated with a different user identifier, UID. The policy function determines the policy that is set as the active policy for the subscription identified by the SID included in the policy information request. Using the determined UID, the policy function obtains and transmits the active policy.

8 Claims, 11 Drawing Sheets

(56) References Cited

U.S. PATENT DOCUMENTS

2017/0180426 A1    6/2017    Mahadik et al.
2020/0045519 A1*  2/2020    Raleigh .................. H04W 4/24

FOREIGN PATENT DOCUMENTS

| CN | 102665191 A | 9/2012 |
| --- | --- | --- |
| CN | 105637814 A | 6/2016 |
| WO | 2011063688 A1 | 6/2011 |

OTHER PUBLICATIONS

Chinese Office Action and Search Report with English Machine Translation dated May 8, 2021 for Patent Application No. 201880094485.1, consisting of 20-pages.

\* cited by examiner

METHOD AND NETWORK NODE FOR IMPLEMENTING USER DEFINED POLICIES BASED ON DEVICE SUBSCRIPTION IDENTIFIERS IN A TELECOMMUNICATION NETWORK

CROSS-REFERENCE TO RELATED APPLICATIONS

This application is a Submission Under 35 U.S.C. § 371 for U.S. National Stage Patent Application of International Application Number: PCT/IN2018/050378, filed Jun. 8, 2018 entitled "METHOD AND SYSTEM FOR IMPLEMENTING USER DEFINED POLICIES IN AN INTELLIGENT NETWORK," the entirety of which is incorporated herein by reference.

TECHNICAL FIELD

Disclosed are embodiments related to policy control based on a user of a subscription.

BACKGROUND

Currently in operations support system (OSS)/business support system (BSS), bandwidth throttling is performed using policy regulation mechanisms provided by interaction between a Policy and Charging Enforcement Function (PCEF), an Online Charging System (OCS), and a Policy and Charging Rules Function (PCRF).

U.S. Patent Application Publication No. US 2017/0019401, filed on Jul. 13, 2015, describes a method for use by a mobile device for conducting multi-user interactions on the device using biometric authentication which involves performing requested actions using a software application.

U.S. Pat. No. 8,630,925, filed on May 9, 2011, describes controlling service traffic in a communication network.

SUMMARY

Policy regulations in current communication networks are based on a subscription identifier linked to a device (e.g., a device's Mobile Station International Subscriber Directory Number (MSISDN)), rather than being based on a user identifier linked to the person actually using the device. This prevents implementation of polices at a user level (i.e., not at the subscription level). For example, if two users share the same device (e.g., a parent and a child), a single policy will apply to both users. This is disadvantageous because, for example, there could be some content that the child's parent does not want the child to be able to access when the child is using the device. As another example, the parent may want to place limits on whom the child may call or text using the device and/or place limits on how long the child can use the device in a given day (e.g., 30 minutes a day). Some methods of content blocking exist, but these are performed at the application level, not at the network level.

Embodiments disclosed herein overcome these disadvantages. In one aspect, there is provided a method performed by a policy function for implementing user defined policies in a communications network. In one embodiment, the method includes the policy function (PF) receiving a policy information request comprising a subscription identifier, SID, identifying a subscription, where a set of two or more policies are linked to the SID and one of the policies included in the set of policies is set as an active policy for the subscription and where each policy is associated with a different user identifier, UID. The method includes the policy function determining, after receiving the policy information request comprising the SID, the policy that is set as the active policy for the subscription identified by the SID. The method includes the policy function obtaining the active policy. The method includes the policy function transmitting, in response to the policy information request, a policy information response comprising the obtained active policy. In some embodiments, the user defined policies offer user specific policies and comprise user specific service authorization under the subscription in the communication network. In some embodiments, the step of determining the policy that is set as the active policy comprises determining a UID that is set as an active UID for the subscription The above described embodiment is advantageous in that it provides a way of realizing dynamic policy allocation based on the end user, rather than based on the device. That is, the embodiment provides the following significant advantages: (1) the application of user based policy restrictions in the network; (2) enablement of instant end-user specific policy enforcements; and (3) enhanced scope for granular policy control.

In some embodiments, the method includes a further step in which the policy function receives a first request to register a particular user, the request comprising the SID and a particular UID assigned to the user. In such embodiments, the policy function adds, after receiving the first request, the particular UID to a set of UIDs linked with the SID.

In some embodiments, the method includes a further step in which the policy function receives a second request to set a policy for the particular user, the request comprising the SID, the particular UID assigned to the user, and a particular user defined policy for the particular user. In such embodiments, the policy function stores, after receiving the second request, the particular user defined policy so that the particular user defined policy is linked with the particular UID.

In some embodiments, the method includes a further step in which the policy function receives a first user service access request transmitted by a user terminal, the first service request comprising the particular UID and the SID. In such embodiments, the policy function sets, after receiving the first user service access request, the particular UID as the active UID for the subscription.

In some embodiments, the policy information request may include the active UID. In some embodiments, determining the UID that is set as the active UID includes parsing the policy information request to obtain the active UID. In some embodiments, determining the UID that is set as the active UID includes using the SID to access a database and obtain the active UID.

In some embodiments, the method includes an additional step in which an enforcement function node receives a service request comprising the active UID and the SID.

In another aspect, there is provided a method for implementing user defined policies in a communications network. In one embodiment, the method includes a user access proxy, UAP, server detecting an active user for a subscription. The method includes the UAP server obtaining a policy associated with the active user. The method includes the UAP server providing the policy with a subscription identifier, SID, identifying the subscription. The method includes an online charging system, OCS, obtaining the policy with the SID. The method includes the OCS replacing an existing policy for the subscription associated with the SID with the received policy. In some embodiments, the method further includes the OCS setting the received policy as an active policy for the active user.

The embodiments may be used by other entities other than those described herein. Similarly, the embodiments may use interfaces equivalent to a Representational State Transfer (REST) web service or a diameter interface. That is, interaction between entities in according to the embodiments may be implemented using interfaces equivalent to a REST web service request or a diameter interface.

In one specific instance, there is provided a system that includes a user access proxy (UAP) server which contains mapping information between a user and a user profile. In some embodiments, this information is internally mapped to a data plan in an OCS. The system also includes a UAP client installed on a device (e.g., provided by an operator). A method includes the UAP client determining the actual person using the device through any number of means available. For example, the UAP client may utilize biometrics for the determination. The method includes the UAP client providing this information (i.e., user identifier) to the UAP server and the UAP server subsequently sending a policy change request to the OCS. In some embodiments, the policy change request may be transmitted via the REST web service request or the diameter interface. The method includes the OCS overwriting an existing policy mapped to the ongoing session with new policy rules obtained from the UAP server. The method includes the OCS sending the updated policy details to a PCRF and the policy changes are made effective instantaneously, within the same data/voice call. In some embodiments, the updated policy details are sent to the PCRF through a ESy interface. In some embodiments, the updated policy details are included in a spending notification request (SNR).

BRIEF DESCRIPTION OF THE DRAWINGS

The accompanying drawings, which are incorporated herein and form part of the specification, illustrate various embodiments.

DETAILED DESCRIPTION

Figure 1:
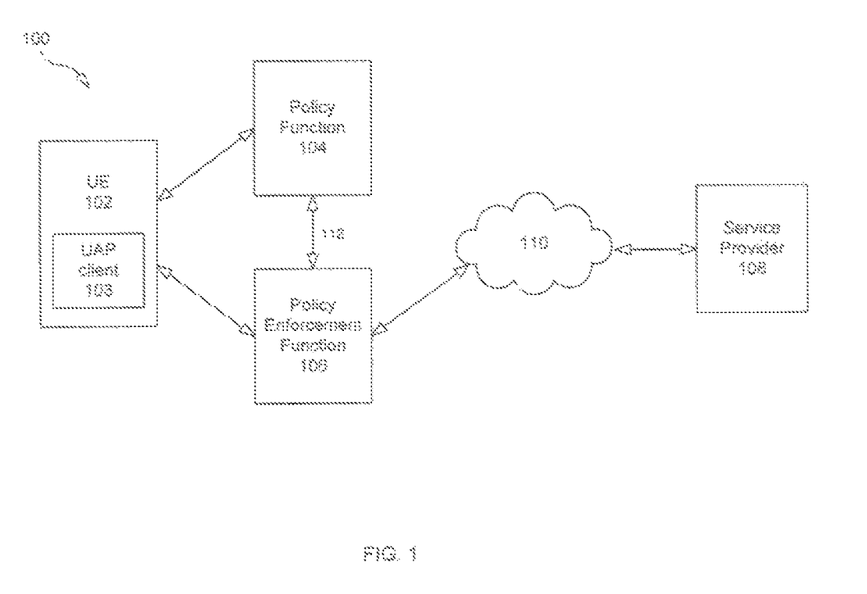
FIG. 1 illustrates a communication network according to some embodiments.

FIG. 1 illustrates a network 100 according to some embodiments. As shown in FIG. 1, the network 100 comprises a user equipment (UE) 102 (i.e., any communication device, mobile or stationary), a policy function (PF) 104, a policy enforcement function (PEF) 106, and a service provider 108 in communication with the PEF 106 through a network 110 (e.g., an Internet Protocol (IP) network such as the Internet). In some embodiments, the UE 102 may comprise a UAP client 103. The UAP client 103 may be an operator provided application which allows a subscription owner to register as a master subscriber for a subscription. While only one service provider 108 is shown in FIG. 1, there may be more than one service providers in the network 100. In some embodiments, one or more interfaces 112 between the PF 104 and the PEF 106 may be used for charging interrogation and/or policy interrogation. In some embodiments, the PEF 106 may comprise a PCEF.

Figure 2:
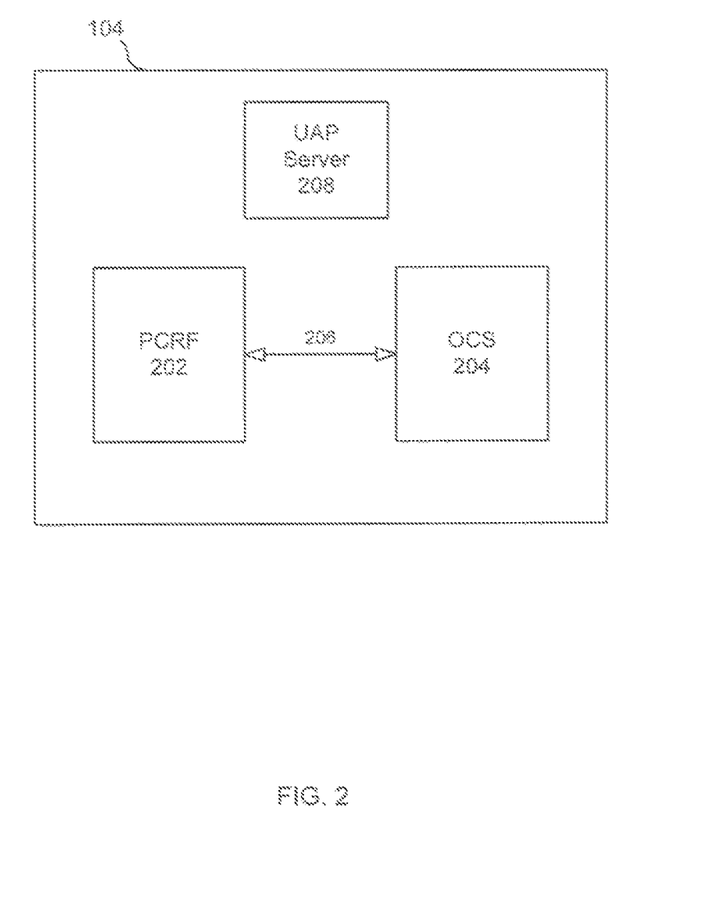
FIG. 2 illustrates a network node according to some embodiments.
Figure 3:
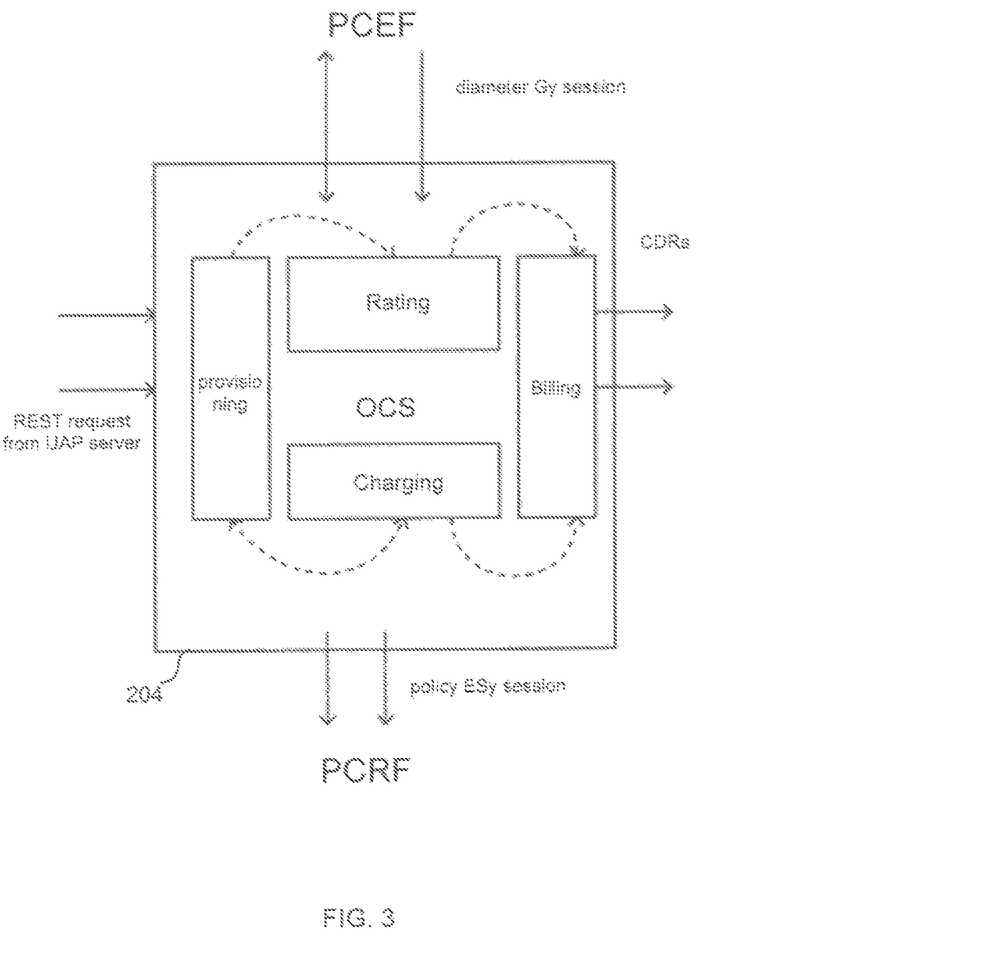
FIG. 3 illustrates a network node according to some embodiments.

As shown in FIG. 2, the PF 104 may comprise a PCRF 202, a OCS 204, and a UAP server 206. In some embodiments, an interface 206 between the PCRF 202 and the OCS 204 may be used to exchange subscription information. In some embodiments, the UAP server 208 is a component of OCS 204. In some embodiments, the UAP server 208 may be a component of the UE 102. An embodiment of OCS 204 is illustrated in further detail in FIG. 3. The OCS 204 may be configured to: (1) maintain a list of end-users eligible to consume services under a subscription, (2) maintain each of the end-user's credentials to control service access under the subscription, and (3) control service access and usage based on the end-user accessing the subscription for a given charging and policy session.

In some embodiments, the UAP client 103 allows the master subscriber to add end-users to the subscription. In some embodiments, identification credentials for the end-user are also recorded when adding an end-user. In some embodiments, the master subscriber may allow and/or restrict service access for the end-user under the subscription. Additionally, the UAP client 103 may capture end-user identification whenever service consumption is triggered for a subscription.

In some embodiments, the UAP server 208 may be configured to: (1) handle requests to add and/or delete end-users for the subscription, (2) handle requests to allow and/or disallow services for an end-user under the subscription, and (3) share the captured end-user credentials to the PF 104 (e.g., the OCS 204) whenever a service usage is triggered for the subscription.

An embodiment of implementing policy regulations based on a user using the UE 102 is explained as follows.

Step 1: the UAP client 103 installed on the UE 102 obtains end-user credentials.

Step 2: The obtained end-user credentials are sent to the UAP server 208 which maps the credentials to an identifier (ID) for the end-user that the OCS 204 can understand.

Step 3: The end-user ID is sent to the OCS 204. In some embodiments, the end-user ID is sent to the OCS 204 through a REST web service request or a diameter interface.

Step 4: The OCS 204 maintains a list of user IDs to policies mapping. The OCS 204 uses this list to control the usage for a given policy session, i.e., select the right policy based on the received end-user ID.

Step 5: The OCS 204 receives a policy session request comprising a subscription ID. In some embodiments, the policy session request is received through an ESy interface. Based on the received policy session request, the OCS 204 may share information regarding the selected policy for the end-user with the PCRF 202. In some embodiments, the selected policy details may be included in a spending notification request (SNR) to the PCRF 202.

Step 6: When the OCS 204 shares the selected policy information with the PCRF 202 (e.g., including the selected policy information in a SNR to the PCRF 202), the PCRF 202 transmits the selected policy information to the PCEF. In some embodiments, the PCRF 202 sends the selected policy information to the PCEF through a Gx interface. Upon receipt of the request, the PCEF throttles the bandwidth according to the selected policy information.

The following examples demonstrate practical use cases for the user based policy control according to some embodiments disclosed herein.

As a first example, the embodiments provide parental guidance. In the first example, a parent A and a child B are the users of a mobile phone. A profile for the parent A may be created with no restrictions. A profile for the child B may be created with a profile of "no social media from date XX to date YY." For example, the child B profile may have the restriction of no social media from Apr. 10, 2018 to Apr. 13, 2018.

In the first example, the details of the profiles (i.e., the parent A profile and the child B profile) are uploaded to the UAP server. Accordingly, no restrictions will be applied when parent A is accessing the device as no new policy profiles will be updated from the UAP server to the OCS 204. In contrast, when child B accesses the device, all social media will be blocked between Apr. 10, 2018 and Apr. 13, 2018, as the UAP server will now send a policy profile identifier to the OCS 204 to which the OCS 204 then updates the policy rule for child B.

As a second example, the embodiments provide public data and voice availability. In the second example, devices, such as electronic tablets, interactive televisions, digital boards, among others, with 3G and/or 4G connectivity are installed in common areas in a community and a resident of the community may want to access the device for a particular service.

In such instances, a user may first use the UAP client for authentication as a member of the community. Then, the user's policy configurations will automatically be mapped to the session the user has instantiated from the device. The user may be provided with different policy privileges and services through the device depending on the user's level within the community. The user may logout once finished using the common device.

Figure 4A:
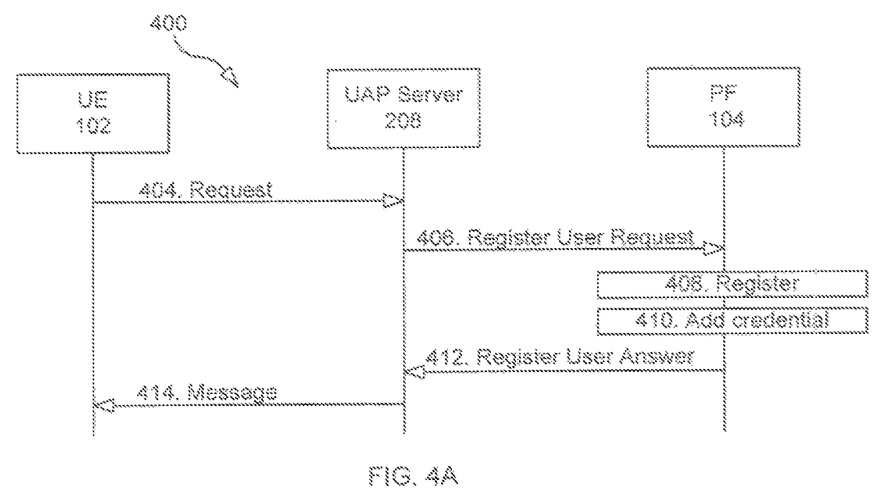
FIGS. 4A-4B is a flow chart illustrating a process according to one embodiment.
Figure 4B:
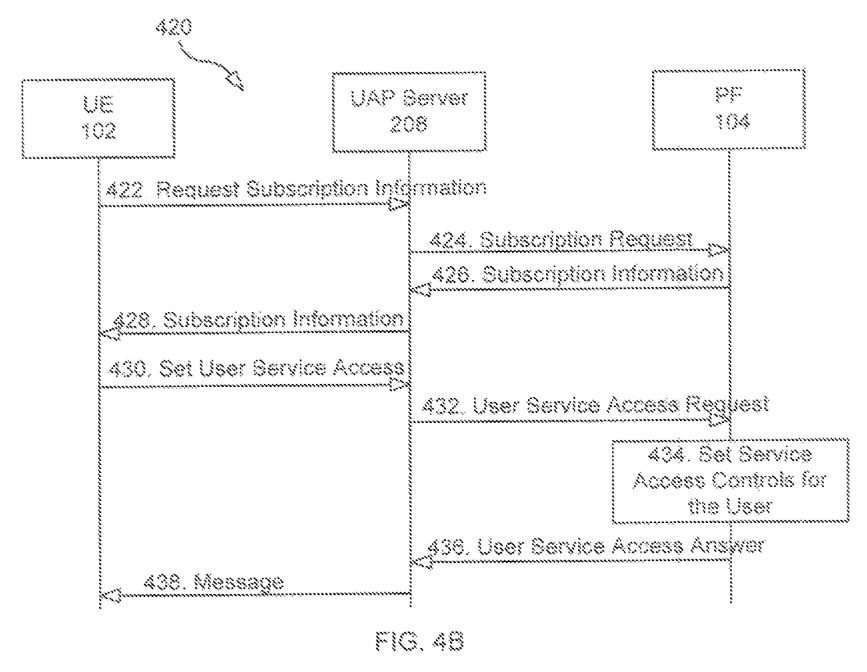

FIGS. 4A-4B illustrate flow diagrams for registering a user for the user based policy restrictions according to some embodiments. In some embodiments, the UAP client is installed on the UE 102. The UAP client 103 supports registration of users and user service access control under a registered subscription. In some embodiments, a user access proxy (UAP) server 208 hosts the UAP client 103 and serves requests from the UAP client 103. The UAP server 208 supports registration of users and their service access towards the PF 104. The PF 104 maintains policy, service control, and accounting information for the subscription. The PF 104 also maintains users of the subscription and user specific policies and service accesses.

FIG. 4A is a flow diagram illustrating a process 400 according to some embodiments. In some embodiments, the process 400 is directed to registering a master subscriber. In such embodiments, in step 404, the UE 102 sends a request to the UAP server 208. In some embodiments, the request comprises a request to register a master subscriber. In such embodiments, the request comprises a subscription ID, a user ID, and master subscriber credentials. In step 406, the UAP server 208 transmits a register user request to the PF 104. In some embodiments, the UAP server 208 transmits the register user request to the OCS 204. In some embodiments, the register user request comprises the subscription ID, the user ID, an indication of the administrator, and the master subscriber credentials. For example, the subscription ID may be "+46703123456," the user ID may be "User 1" and an administrator indication flag may indicate "true." In step 408, the PF 104 registers the user. In some embodiments, the PF 104 registers the master subscriber to the subscription in step 408. For example, the PF 104 registers the master subscriber to the subscription "+46703123456." In step 410, the PF 104 updates the subscription. In some embodiments, the PF 104 adds the master subscriber credentials to the subscription in step 410. For example, the master subscriber credentials are added to the subscription as an administrator. In step 412, the PF 104 sends a register user answer to the UAP server 208. In some embodiments, the register user answer comprises an indication that the registration was successful. In step 414, the UAP server 208 sends a message to the UE 102 comprising an indication that the registration was successful.

In other embodiments, the process 400 is directed to registering a user to the subscription. In such embodiments, in step 404, the UE 102 sends a request to the UAP server 208 which comprises a request to register a subscription user. The request to register the subscription user may comprise a subscription ID, a user ID, and user credentials according to some embodiments. In step 406, the UAP server 208 transmits a register user request to the PF 104 which comprises the subscription ID, the user ID, an indication of the administrator, and the user credentials. For example, the subscription ID may be "+46703123456," the user ID may be "User 1234" and an administrator indication flag may indicate "negative." In step 408, the PF 104 registers the user. In some embodiments, the PF 104 registers the user to the subscription in step 408. For example, the PF 104 registers the user ID "User1234" to the subscription "+46703123456." In step 410, the PF 104 updates the subscription. In some embodiments, the PF 104 adds the user credentials to the subscription in step 410. In step 412, the PF 104 sends a register user answer to the UAP server 208. In some embodiments, the register user answer comprises an indication that the registration was successful. In step 414, the UAP server 208 sends an answer to the UE 102 comprising the indication that the registration was successful.

FIG. 4B is a flow diagram illustrating a process 420 according to some embodiments. In some embodiments, the process 420 is directed to controlling user service access. In step 422, the UE 102 may request subscription information. For example, the UE 102 may transmit a request to fetch available services and policies applicable for the user according to the subscription. In step 424, the UAP server 208 transmits a request to obtain the subscription information. In some embodiments, the request may comprise a subscription ID. In step 426, the PF 104 transmits a message comprising the subscription information associated with the subscription ID. In some embodiments, the message may comprise the subscription ID and subscription information. In step 428, the UAP server 208 transmits the subscription information to the UE 102. In step 430, the UE 102 sets the user service access. In some embodiments, the UE 102 may capture the subscription ID, the user ID, and service access policies selected for the user. In step 432, the UAP server 208 transmits a user service access request. In some embodiments, the user service access request comprises an indication of a requested action, the subscription ID, the user ID, and the selected service access policies. For example, the action indication may indicate "set," the subscription ID may be "+46703123456" and the user ID may be "User1234." In step 434, the PF 104 sets service access controls for the user. In some embodiments, the PF 104 sets service access controls for the user associated with the user ID (e.g., "User1234") under the subscription (e.g., "+46703123456"). In step 436, the PF 104 sends a user service access answer to the UAP server 208. In some embodiments, the user service access answer comprises an indication that the set up was successful. In step 438, the UAP server 208 sends a message to the UE 102 comprising an indication that the service access control for the user has been set successfully.

Figure 5:
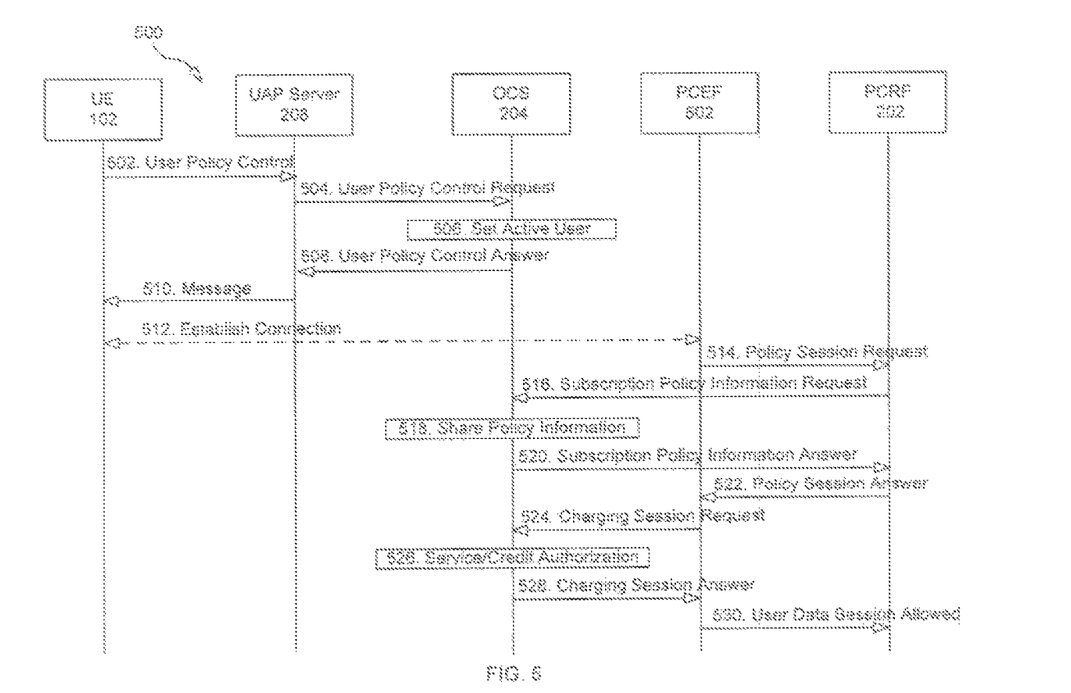
FIG. 5 is a flow chart illustrating a process according to one embodiment.

FIG. 5 is a flow diagram illustrating a process 500 according to some embodiments. In some embodiments, the process 500 is directed to a service session in accordance to the user based policy restrictions. In step 502, a user using the UE 102 controls a user policy. In some embodiments, the UE 102 captures a subscription ID, a user ID, and user credentials in step 502. In step 504, the UAP server 208 transmits a user policy control request. In some embodiments, the user policy control request comprises an indication of a requested action, the subscription ID, and the user ID. For example, the action indication may indicate "access," the subscription ID may be "+46703123456," and the user ID may be "User1234." Optionally, the user policy control request may further comprise the captured user credentials. In step 506, the OCS 204 sets the user associated with the received user ID as "active" for the subscription associated with the subscription ID. For example, the OCS 204 may set user "User 1234" as the active user for the subscription associated with the subscription ID "+46703123456." In some embodiments, if a previous user service access request has not been received prior to step 504, a default user is set as the active user for the subscription associated with the subscription ID until the OCS 204 receives a user service access request. For example, when the OCS 204 has not received any user access information, the OCS 204 sets a default user (e.g., administrator) as the active user for the subscription associated with the subscription ID "+46703123456." In step 508, the OCS 204 sends a user policy control answer to the UAP server 208. In some embodiments, the user policy control answer comprises an indication that the active user has been set successfully. In step 510, the UAP server 208 sends a message to the UE 102 comprising an indication that the active user has been set successfully.

In step 512, the UE 102 establishes a connection with the PCEF 502 via a radio access network. For example, in one embodiment, the UE 102 establishes an indirect connection to the PCEF 502.

In step 514, the PCEF 502 transmits a policy session request to the PCRF 202. In some embodiments, the PCEF 502 uses a Gx interface to transmit the policy session request. In step 516, the PCRF 202 transmits a subscription policy information request to the OCS 204. In some embodiments, the PCRF 202 uses a ESy interface to transmit the subscription policy information request. The subscription policy information request may comprise a subscription ID. In step 518, the OCS 204 shares policy information with the PCRF 202. In some embodiments, the OCS 204 shares policy information applicable for an active user for the subscription associated with the subscription ID. For example, the OCS 204 may share policy information applicable for a user (e.g., "User1234") under the subscription associated with the subscription ID (e.g., "+46703123456"). In step 520, the OCS 204 transmits a subscription policy information answer to the PCRF 202. In some embodiments, the subscription policy information answer comprises the policy information applicable for the active user. In step 522, the PCRF 202 transmits a policy session request to the PCEF 502. In step 524, the PCEF 502 transmits a charging session request to the OCS 204. In some embodiments, the PCEF 502 uses a Gy interface to transmit the charging session request. In step 526, the OCS 204 authorizes services and/or credits according to the services and policies provisioned for the active user. In step 528, the OCS 204 transmits a charging session answer to the PCEF 502, to which the PCEF 502 allows a data session for the user in step 530.

Figure 6:
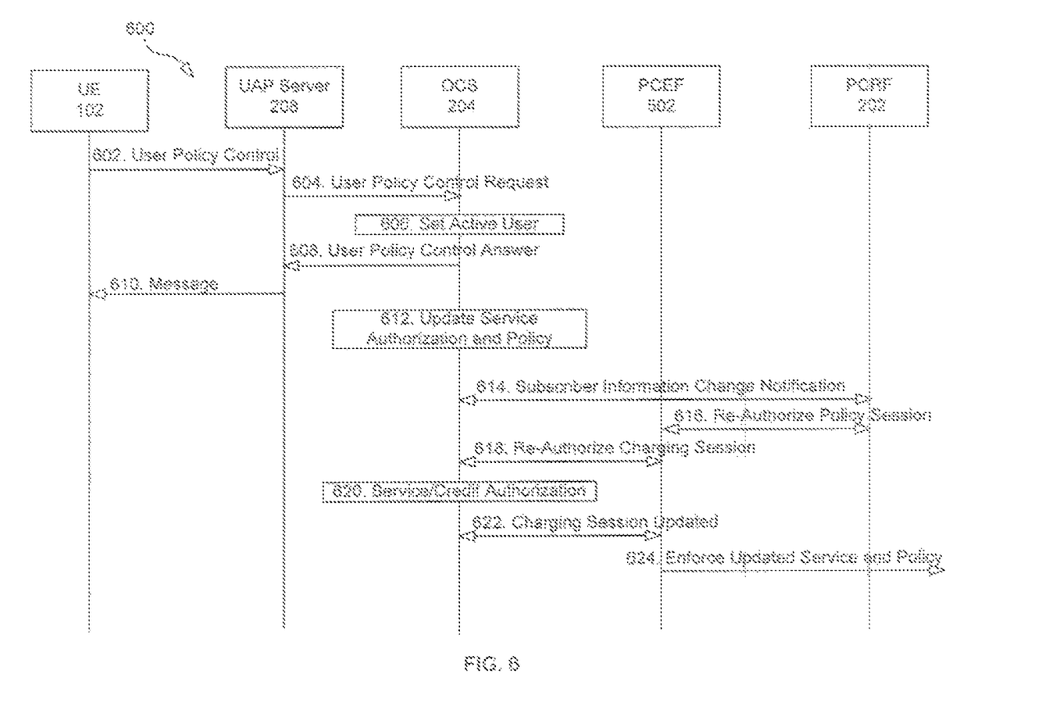
FIG. 6 is a flow chart illustrating a process according to one embodiment.

FIG. 6 illustrates a process 600 according to some embodiments. In some embodiments, the process 600 is directed to applying changes in a service session while the service session is ongoing in accordance to the user based policy restrictions. In some embodiments, the process 600 may be performed after the service session described in process 500.

During an ongoing data session, a second user using the UE 102 controls a user policy in step 602. In some embodiments, the UE 102 captures a subscription ID, a second user ID, and second user credentials in step 602. In step 604, the UAP server 208 transmits a user policy control request. In some embodiments, the user policy control request comprises an indication of a requested action, the subscription ID, and the second user ID. For example, the action indication may indicate "access," the subscription ID may be "+46703123456," and the second user ID may be "UserXXXX." Optionally, the user policy control request may further comprise the second user credentials. In step 606, the OCS 204 sets the user associated with the received second user ID as "active" for the subscription associated with the subscription ID. For example, the OCS 204 may set user "UserXXXX" as the active user for the subscription associated with the subscription ID "+46703123456." As another example, the OCS 204 may replace a first user associated with user ID "User1234" with the second user associated with the user ID "UserXXXX" as the active user for the subscription. In step 608, the OCS 204 sends a user policy control answer to the UAP server 208. In some embodiments, the user policy control answer comprises an indication that the active user has been set successfully. In step 610, the UAP server 208 sends a message to the UE 102 comprising an indication that the active user has been set successfully.

In step 612, the OCS 204 updates service authorization and policies applicable for the second user. In step 614, the PCRF 202 transmits a subscriber information change notification to the OCS 204. In some embodiments, the PCRF 202 uses the ESy interface to transmit the subscriber information change notification. In step 616, the PCRF 202 transmits a re-authorize policy session message to the PCEF 502. In some embodiments, the PCRF 202 uses the Gx interface to send the re-authorize policy session message. In step 618, the PCEF 502 transmits a re-authorize charging session message to the OCS 204. In some embodiments, the PCEF 502 uses the Gy interface to send the re-authorize charging session message. In step 620, the OCS 204 authorizes the service and credit for the second user. For example, the OCS 204 grants service authorization and credit authorization for the second user associated with the second user ID "UserXXXX." In step 622, the charging session is updated and the PCEF 502 enforces the updated charging service and policy information on the ongoing data session in step 624.

Figure 7:
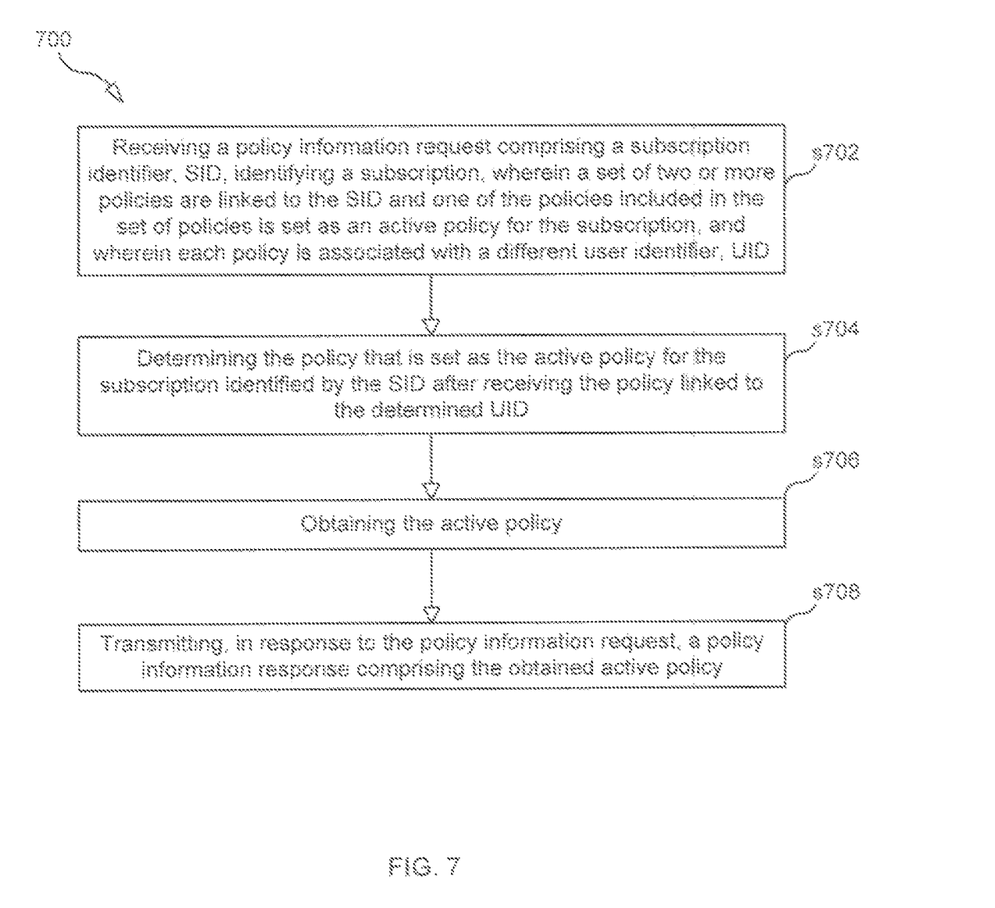
FIG. 7 is a flow chart illustrating a process according to one embodiment.

FIG. 7 is a flow chart illustrating a process 700, according to some embodiments, that is performed by a PF 104 for implementing user defined policies in a communication network. Process 700 may begin with step s702 in which the PF 104 receives a policy information request comprising a subscription identifier, SID, identifying a subscription. In some embodiments, a set of two or more policies are linked to the SID and one of the policies included in the set of policies is set as an active policy for the subscription where each policy is associated with a different user identifier, UID. In step s704, the PF 104 determines, after receiving the policy information request comprising the SID, the policy that is set as the active policy for the subscription identified by the SID. In step s706, the PF 104 obtains the active policy. In step s708, the PF 104 transmits, in response to the policy information request, a policy information response comprising the obtained active policy. In some embodiments, the user defined policies offer user specific policies and comprise user specific service authorization under the subscription in the communication network. In some embodiments, the step of determining the policy that is set as the active policy comprises determining a UID that is set as an active UID for the subscription In some embodiments, the process 700 includes a further step in which the RF node receives a first request to register a particular user, the request comprising the SID and a particular UID assigned to the user. In such embodiments, the RF node adds, after receiving the first request, the particular UID to a set of UIDs linked with the SID.

In some embodiments, the process 700 includes a further step in which the RF node receives a second request to set a policy for the particular user, the request comprising the SID, the particular UID assigned to the user, and a particular user defined policy for the particular user. In such embodiments, the RF node stores, after receiving the second request, the particular user defined policy so that the particular user defined policy is linked with the particular UID.

In some embodiments, the process 700 includes a further step in which the RF node receives a first user service access request transmitted by a user terminal, the first service request comprising the particular UID and the SID. In such embodiments, the RF node sets, after receiving the first user service access request, the particular UID as the active UID for the subscription.

In some embodiments, the policy information request may include the active UID. In some embodiments, determining the UID that is set as the active UID includes parsing the policy information request to obtain the active UID. In some embodiments, determining the UID that is set as the active UID includes using the SID to access a database and obtain the active UID.

In some embodiments, the process 700 includes an additional step in which an enforcement function node (e.g., PEF 106) receives a service request comprising the active UID and the SID.

Figure 8:
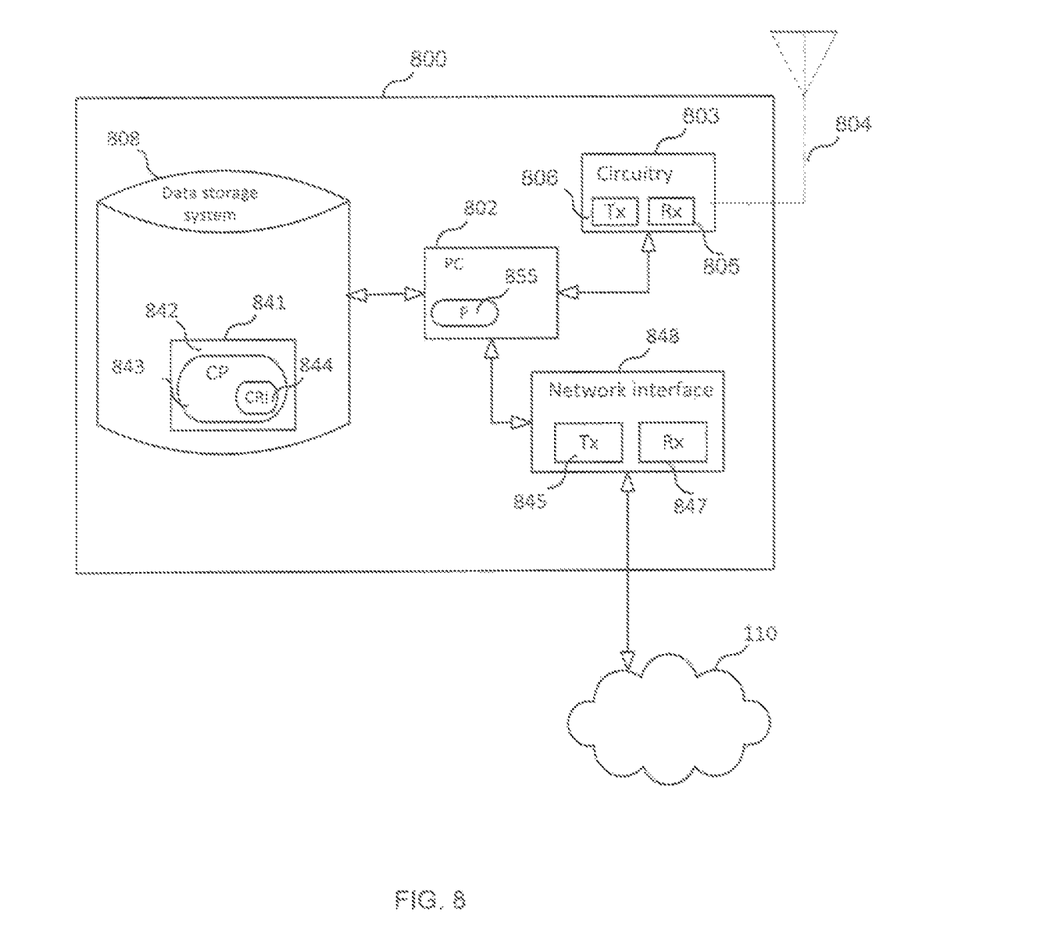
FIG. 8 is a block diagram of a network node according to one embodiment.

FIG. 8 is a block diagram of node 800 according to some embodiments. As shown in FIG. 8, node 800 may comprise: a processing circuit (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling node 800 to transmit data to and receive data from other nodes connected to a network 110 (e.g., an Internet Protocol (IP) network) to which network interface 848 is connected; circuitry 803 (e.g., radio transceiver circuitry comprising an Rx 805 and a Tx 806) coupled to an antenna system 804 for wireless communication with UEs); and local storage unit (a.k.a., "data storage system") 808, which may include one or more non-volatile storage devices and/or one or more volatile storage devices (e.g., random access memory (RAM)). In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory, flash memory), and the like. In some embodiments, the CRI 844 of computer program 843 is configured such that when executed by data processing apparatus 802, the CRI causes node 800 to perform steps described herein (e.g., steps described herein with reference to the flow charts and/or message flow diagrams). In other embodiments, node 800 may be configured to perform steps described herein without the need for code. That is, for example, PC 802 may consist merely of one or more ASICs. Hence, the features of the embodiments described herein may be implemented in hardware and/or software. In some embodiments, the node 800 is configured to implement the functions of the PF 104.

Figure 9:
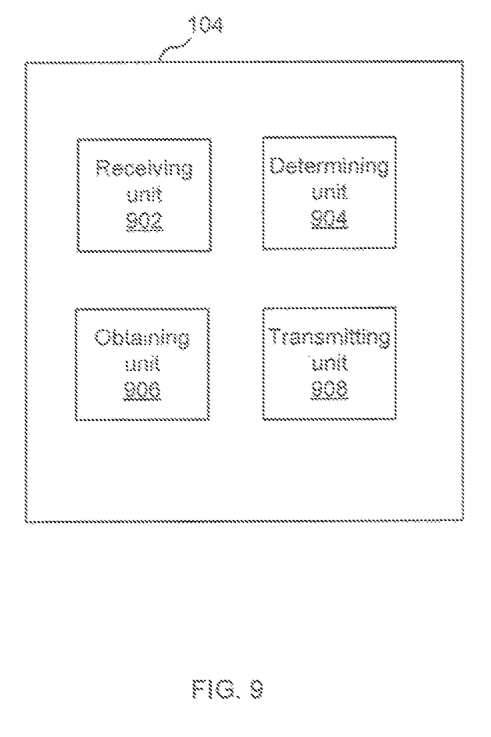
FIG. 9 is a diagram showing functional units of a network node according to one embodiment.

FIG. 9 is a diagram showing functional units of PF 104 according to some embodiments. As shown in FIG. 9, PF 104 includes a receiving unit 902 for receiving a policy information request comprising a subscription identifier, SID, identifying a subscription, where a set of two or more policies are linked to the SID and one of the policies included in the set of policies is set as an active policy for the subscription; a determining unit 904 for determining after receiving the policy information request comprising the SID, the policy that is set as the active policy for the subscription identified by the SID; an obtaining unit 906 for obtaining the active policy; and a transmitting unit 908 for transmitting, in response to the policy information request, a policy information response comprising the obtained active policy.

Figure 10:
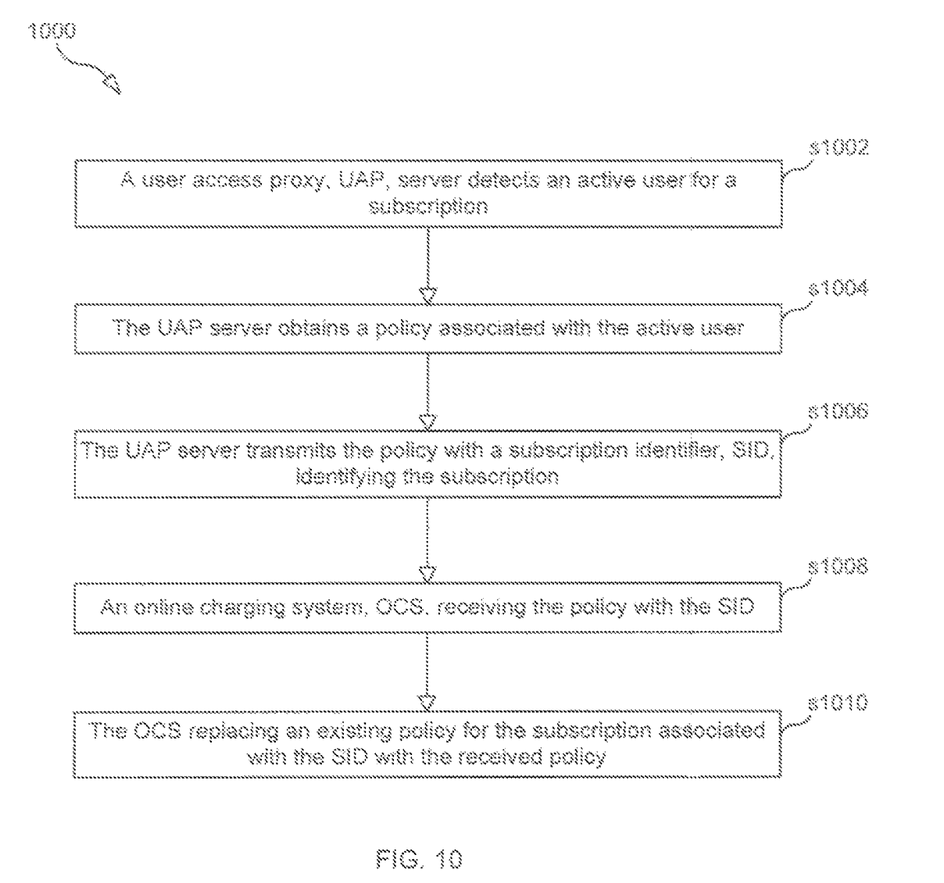
FIG. 10 is a flow chart illustrating a process according to one embodiment.

FIG. 10. is a flow chart illustrating a process 1000, according to some embodiments, for implementing user defined policies in a communication network. Process 1000 may begin with step s1002 a user access proxy, UAP, server detects an active user for a subscription. In step s1004, the UAP server obtains a policy associated with the active user. In step s1006, the UAP server transmits the policy with a subscription identifier, SID, identifying the subscription. In step s1008, an online charging system, OCS, receives the policy with the SID. In step s1010, the OCS replaces an existing policy for the subscription associated with the SID with the received policy. In some embodiments, the process 1000 includes a further step in which the OCS sets the received policy as an active policy for the active user.

Figure 11:
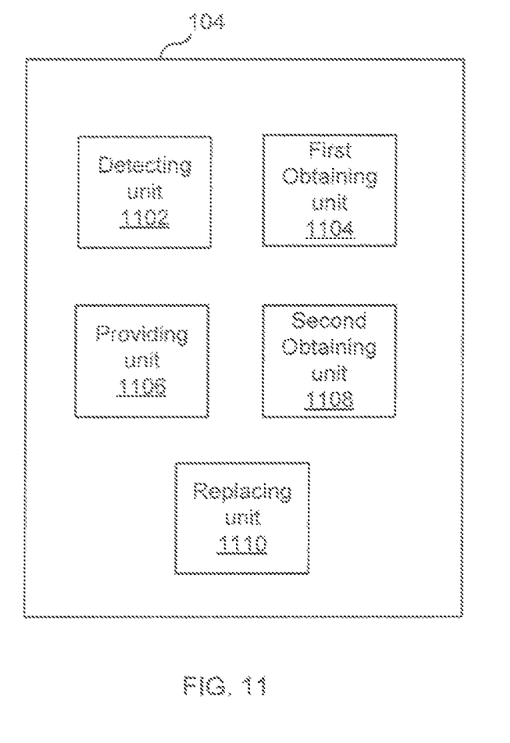
FIG. 11 is a diagram showing functional units of a network node according to one embodiment.

FIG. 11 is a diagram showing functional units of PF 104 according to some embodiments. As shown in FIG. 11, PF 104 includes a detecting unit 1102 for detecting an active user for a subscription; a first obtaining unit 1104 for obtaining a policy associated with the active user; a providing unit 1106 for providing the policy with a subscription identifier, SID, identifying the subscription; a second obtaining unit 1108 for receiving the policy with the SID; and a replacing unit 1110 for replacing an existing policy for the subscription associated with the SID with the received policy.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in a network node for implementing user defined policies in a communication network, the method comprising:
   receiving from a device a policy information request comprising a subscription identifier, SID, linked to the device identifying a subscription, a set of two or more policies being linked to the SID, and one of the policies included in the set of policies is set as an active policy for the subscription, each policy being associated with a different user identifier, UID, the policies offering user specific policies and comprising user specific service authorizations under the subscription in the communication network;
   after receiving the policy information request comprising the SID, determining the policy that is set as the active policy for the subscription identified by the SID, determining the policy that is set as the active policy comprising determining a UID that is set as an active UID for the subscription and determining the UID that is set as the active UID comprising parsing the policy information request to obtain the active UID;
   obtaining the active policy from a data base;
   in response to the policy information request, transmitting a policy information response to the device comprising the obtained active policy;
   receiving a first request to register a particular user, the request comprising the SID and a particular UID assigned to the user;
   after receiving the first request, adding the particular UID to a set of UIDs linked with the SID;
   receiving a second request to set a policy for the particular user, the request comprising the SID, the particular UID assigned to the user, and a particular user defined policy for the particular user; and
   after receiving the second request, storing the particular user defined policy so that the particular user defined policy is linked with the particular UID.

2. The method of claim 1, further comprising:
   receiving a first user service access request transmitted by a user terminal, the first service request comprising the particular UID and the SID; and
   after receiving the first user service access request, setting the particular UID as the active UID for the subscription.

3. The method of claim 1, wherein the policy information request comprises the active UID.

4. The method of claim 1, wherein determining the UID that is set as the active UID comprises:
   using the SID to access a database and obtain the active UID.

5. The method of claim 1, further comprising:
   an enforcement function node receiving a service request comprising the active UID and the SID.

6. A network node comprising communication circuitry configured for transmitting from an antenna array, and processing circuitry operatively associated with the communication circuitry and configured to:
   receive a policy information request from a device comprising a subscription identifier, SID, linked to the device identifying a subscription, wherein a set of two or more policies are linked to the SID and one of the policies included in the set of policies is set as an active policy for the subscription, and wherein each policy is associated with a different user identifier, UID, the policies offering user specific policies and comprising user specific service authorizations under the subscription in the communication network;
   after receiving the policy information request comprising the SID, determine the policy that is set as the active policy for the subscription identified by the SID, determining the policy that is set as the active policy comprising determining a UID that is set as an active UID for the subscription and determining the UID that is set as the active UID comprising parsing the policy information request to obtain the active UID;
   obtain the active policy from a data base;
   in response to the policy information request, transmit a policy information response to the device comprising the obtained active policy;
   receive a first request to register a particular user, the request comprising the SID and a particular UID assigned to the user;
   after receiving the first request, add the particular UID to a set of UIDs linked with the SID;
   receive a second request to set a policy for the particular user, the request comprising the SID, the particular UID assigned to the user, and a particular user defined policy for the particular user; and
   after receiving the second request, store the particular user defined policy so that the particular user defined policy is linked with the particular UID.

7. The network node of claim 6, wherein the processing circuitry is further configured to:
   receive a first user service access request transmitted by a user terminal, the first service request comprising the particular UID and the SID; and
   after receiving the first user service access request, set the particular UID as the active UID for the subscription.

8. The network node of claim 6, wherein the policy information request comprises the active UID.

* * * * *